United States Patent [19]
Kano

[11] 3,909,115
[45] Sept. 30, 1975

[54] LENS WITH HIGH RESOLVING POWER BUT RELATIVELY SMALL REDUCTION RATIO

[75] Inventor: Ichiro Kano, Yokohama, Japan
[73] Assignee: Canon Kabushiki Kaisha, Japan
[22] Filed: Dec. 20, 1973
[21] Appl. No.: 426,813

[30] Foreign Application Priority Data
Dec. 26, 1972 Japan.................................... 48-996

[52] U.S. Cl. ................................................ 350/214
[51] Int. Cl.² ............................................. G02B 9/00
[58] Field of Search...................... 350/214, 215, 216

[56] References Cited
UNITED STATES PATENTS

| | | | |
|---|---|---|---|
| 2,771,817 | 11/1956 | Aklin ................................... | 350/216 |
| 3,133,983 | 5/1964 | Richless et al...................... | 350/216 |
| 3,524,699 | 8/1970 | Mori .................................... | 350/214 |

*Primary Examiner*—Ronald L. Wibert
*Assistant Examiner*—Conrad J. Clark
*Attorney, Agent, or Firm*—Toren, McGeady and Stanger

[57] ABSTRACT

The lens consists of the first, the second . . . and the eighth lens group seen from the object. The first lens group comprises a negative meniscus lens with a convex face facing the object and works as a positive lens as a whole. The second lens group comprises a positive meniscus lens with a convex face facing the object. The third lens group comprises a negative meniscus lens with a convex face facing the object. The fourth lens group comprises a lens with a concave face facing the object and works as a negative lens as a whole. The fifth lens group comprises a negative meniscus lens with a concave face facing the object. The sixth lens group comprises a positive meniscus lens with a concave face facing the object. The seventh lens group comprises a lens with convex faces. The eighth lens group comprises a positive meniscus lens with the convex face facing the object. Each of the principal rays from the lens system is converted to be parallel to the optical axis by means of the sixth, the seventh and the eighth lens.

7 Claims, 6 Drawing Figures

LENS WITH HIGH RESOLVING POWER BUT RELATIVELY SMALL REDUCTION RATIO

The present invention relates to a lens system, more particularly to a lens system in which each of principal rays from the lens system is parallel to the optical axis, namely, the exit pupil is at infinite distance. This lens system can be applied as a lens with high resolving power for reducing printing ($\beta = -0.33 \sim -0.7$) in case of IC-printing.

The lens system of the present invention is very suitable to the projected image viewing device disclosed in U.S. Pat. No. 3,794,421, issued Feb. 26, 1974 which device uses a lens system in which the exit pupil is at infinite distance.

Until now the copy of a photomask and the printing of a photomask on wafer have been carried out according to the contact printing process. This process has a shortcoming that the photomask or the wafer is damaged. In order to avoid this shortcoming the so called contactless printing process is proposed, whereby the printing is carried out, being projected by means of a lens with high resolving power. As the lens to be used for this projection printing, a lens with equal magnification of completely symmetrical type has generally been adopted. The reason is that when a lens with equal magnification is used the photomask used for the contact printing process can also be used without modification. The lens with equal magnification presents as its nature such an advantage that when the lens is designed as a completely symmetrical type, the coma and distortion are automatically compensated. However, on the other hand, the effective F number (Fe) of the lens for reduced image forming becomes larger than that for the equal image forming even if the F numbers are equal ($Fe = (1-\beta) \cdot F$, whereby $\beta =$ Image magnification power, $F = F$ number), so that in order to obtain a resolving power equal to that of the lens for reduced image forming, the $F$ number of the lens has to be made smaller, which makes the compensation of aberrations difficult. Therefore in order to obtain a higher resolving power it is better to keep the image forming magnification power of the lens for projection printing as low as possible. However, it is necessary to reach a compromise of the necessary resolving power with the necessary picture size, because the picture size becomes too small with too small an image forming magnification power.

What is most important for this kind of the lens for reduced printing is the compensation of distortion. It is impossible to completely compensate the distortion by designing the lens as of completely symmetrical type as in the case of printing of equal magnification.

The inventor has succeeded in realizing a lens system free from the above mentioned shortcoming. This lens system relates to a lens with high resolving power but small distortion for large picture size, being realized by setting up new conditions described below so as to keep the reduction ratio comparatively small.

Seen from the object are disposed a lens I working as a positive lens as a whole, in which a negative meniscus lens Ia with the convex face facing the object and a lens Ib with convex face are cemented with each other or disposed with an interval from each other, a positive meniscus lens II with the convex face facing the object, a negative meniscus lens III, in which two lenses are cemented with each other whereby the face facing the object of the lens next to the object is convex, a lens IV working as-lens as a whole, which consists of a single lens or several lenses cemented with each other whereby the face facing the object of the lens next to the object in concave, a negative meniscus lens V, which consists of two lenses cemented with each other whereby the face facing the object of the lens next to the object is concave, a positive meniscus lens VI with the concave face facing the object, a lens VII with convex faces and a positive meniscus lens VIII which consists of a lens VIIIa with convex faces and a lens VIIIb with concave faces cemented with each other whereby the face facing the object of the lens next to the object is convex, whereby the following conditions are fulfilled.

1. $-3.7/f < \phi_1 + \phi_2 + \phi_3 < -2.5/f$
2. $-0.15 < e_1'\phi_1 - e_2'\phi_3 < 0$
3. $0.8f < f_1 < 1.5f$
4. $0.8f < f_{II} < 1.2f$
5. $0.8f < f_{VI} < 1.2f$
6. $0.8f < f_{VII} < 1.2f$
7. $0.8f < f_{VIII} < 1.2f$
8. $-1.5 < f/f_{IV} < 0$
9. $0.16 < d_{II} < 0.25$
10. $0.12 < d_V < 0.2$
11. $n_{Ib} > 1.65$
12. $n_{II} > 1.65$
13. $n_{VI} > 1.65$
14. $n_{VII} > 1.65$
15. $n_{VIIIa} > 1.65$ Hereby $f$; Focal distance of the whole system $f_1, f_{II}, f_{IV}, f_{VI}, f_{VII}, f_{VIII}$; Respectively focal distances of the lens I, II, IV, VI, VII, and VIII $\phi_1$; Refractive power calculated in the air of the first block consisting of the lens I and the lens II.

$\phi_2$; Refractive power calculated in the air of the second block consisting of the lens I, the lens II and the lens element near the object of the lens III.

$\phi_3$; Refractive power calculated in the air of the third block consisting of the lens I, the lens II, the lens III, the lens IV and the lens element near the object of the lens V.

$e_1'$; Distance calculated in the air between the principal point of the first block and that of the second block.

$e_2'$; Distance calculated in the air between the principal point of the second block and that of the third block.

$d_{II}, d_V$; Thickness of the lens III respectively V along the axis $n_{Ib}, n_{II}, n_{VI}, n_{VII}, n_{VIIIa}$; Respectively refraction index of the lens Ib, II, VI, VII and VIIIa The above conditions will be explained below. Among the above mentioned conditions, the conditions (1), (2), (8), (9) and (10) are especially fundamental in order to realize the power of the present invention, whereby the condition (1) is the fundamental one to give a proper compensation for the curvature of field and in case ($\phi_1 + \phi_2 + \phi_3$) is smaller than the lower limit, the curvature of field is over compensated while in case ($\phi_1 + \phi_2 + \phi_3$) is larger than the upper limit, the curvature of field is under compensated. The condition (2) is the fundamental one to give a proper compensation for the coma and the distortion, whereby in case ($e_1'\phi_1 - e_2'\phi_2$) is smaller than the lower limit, the coma and the distortion are under compensated, while in case $(e_1'\phi_1 - e_2'\phi_2)$ is larger than the upper limit, the coma and the distortion are over compensated.

The conditions (3)–(7) are all those to give finer compensations to the spherical aberration, whereby if any one of them is not fulfilled, the disposition of + refraction in the system goes out of balance in such a manner that the spherical aberration taking place in a lens with specially strong refraction cannot be compensated by other elements. The conditions (8)–(10) are all to give proper compensations to the halo out of the axis and the curvature of field, whereby in case the value is smaller than the lower limit, the curvature of field is under compensated, while when the value is larger than the upper limit, the halo out of the axis is over compensated. The conditions (11)–(15) are all those to give finer compensation to the spherical aberration, the curvature of field and the halo out of the axis, whereby when the value is smaller than the lower limit, every aberration is under compensated.

The present lens system is characterized in that each of the principal rays from the lens system is parallel to the optical axis, namely the exit pupil is at infinite distance due to provision of a positive meniscus lens VI, a lens VII with convex faces and a positive meniscus lens in the rear part.

The feature that the principal rays from the lens system an parallel is very convenient for adjusting the position of mask when IC is printed.

The purpose of the present invention is to offer a lens system in which each of the principal rays from the lens system is parallel.

The other purpose of the present invention is to offer a lens system which is convenient for printing an IC pattern.

Figure 1:
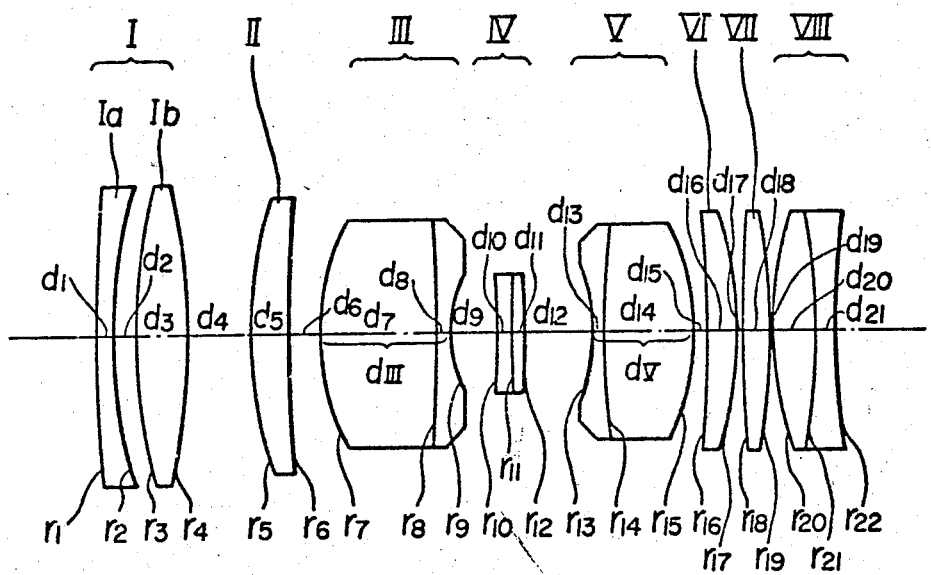
FIGS. 1, 3 and 5 are embodiments of the present invention.
Figure 2:
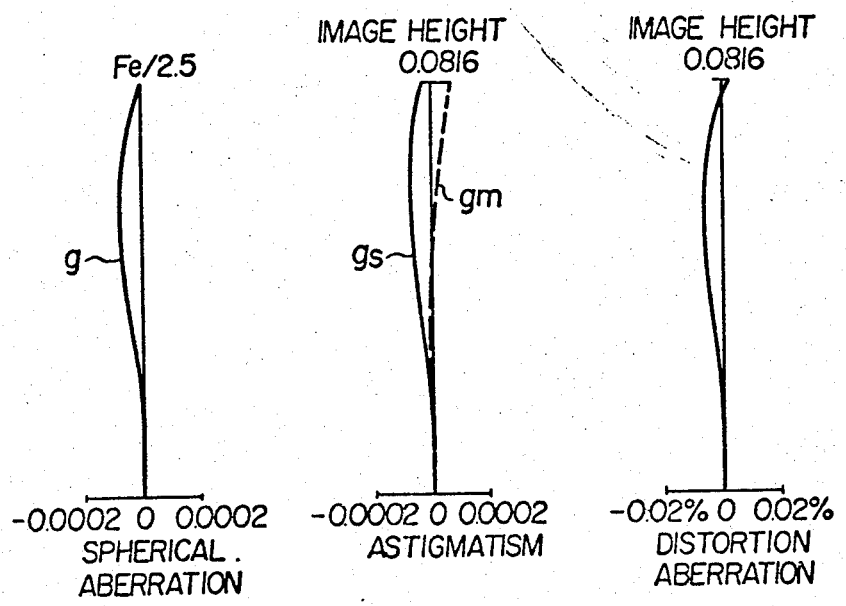
FIGS. 2, 4 and 6 are graphic representation of the aberrations of the embodiments.
Figure 3:
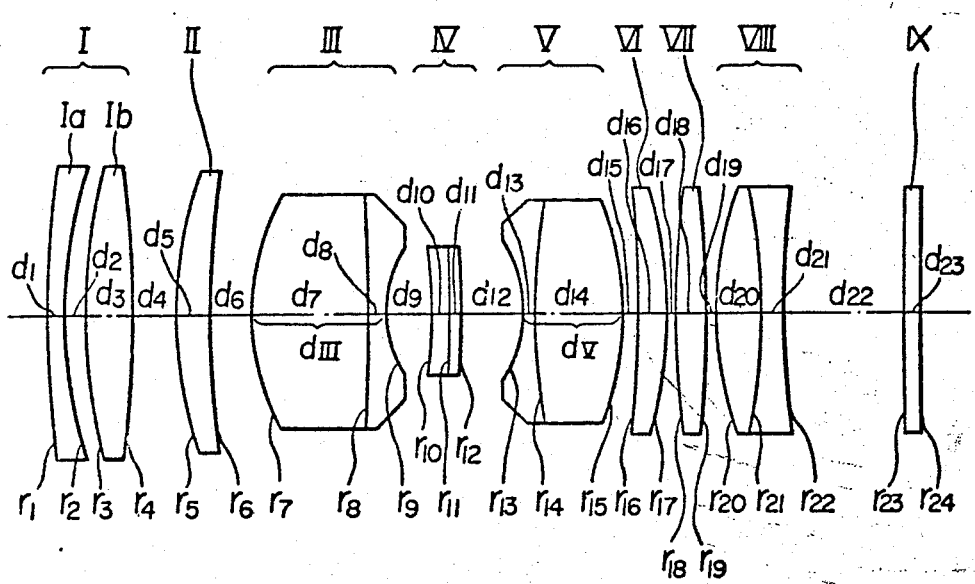
Figure 4:
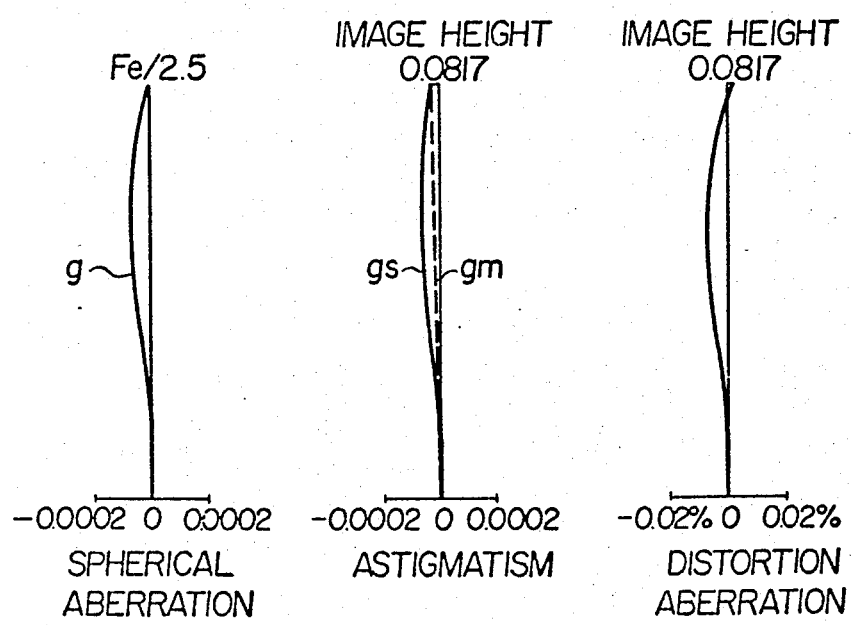
Figure 5:
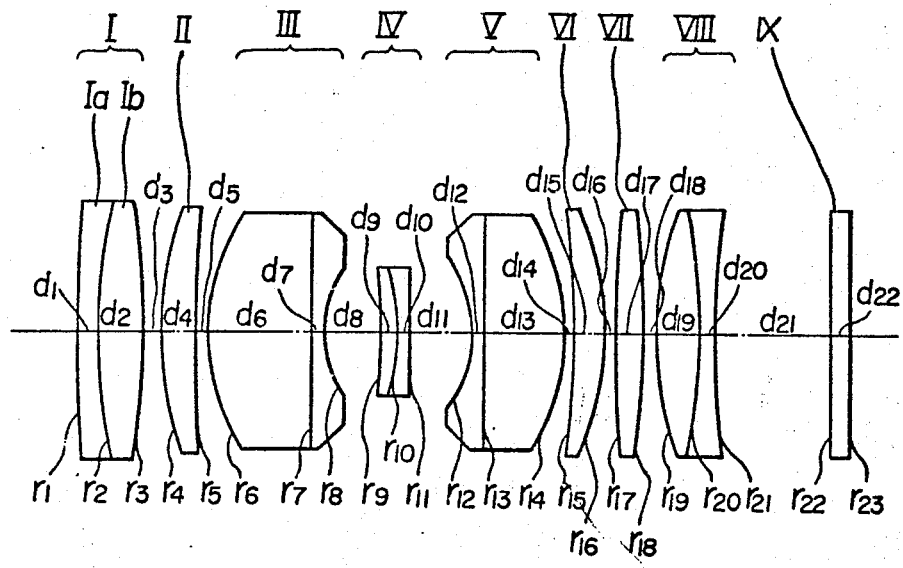
Figure 6:
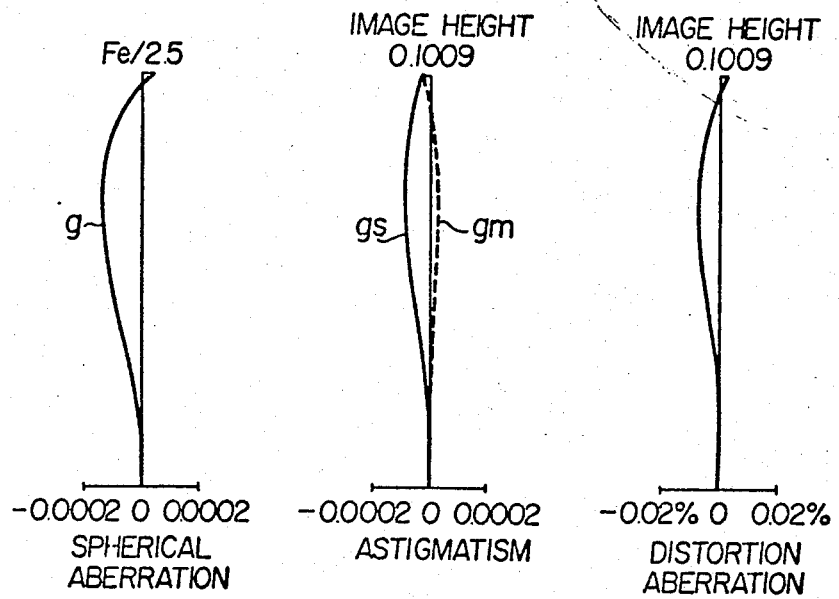

The present invention will be explained below according to three examples. In all the examples, a compensation has been carried out for the light beam with wave length of 436mm (g-line). In the example (1), the lens I does not consist of lens elements cemented to each other. In the example (2) the lens I also does not consist of lens elements cemented to each other and further a plane parallel plate (IX) is inserted in the rear part of the lens. This plane parallel plate serves to keep nitrogen on the photosensitive surface in order prevent photoresist from the so called oxydation in case printing is carried out for the photoresist of negative type. Where the thickness of the plane parallel plate is smaller than about $0.3f$, the aberration taking place there can be compensated by means of small variation within the gist of the present invention. Therefore the lens system with such an inserted plane parallel plate is to be considered to be a part of the present invention. In the example (III) the lens I consists of the lens elements cemented to each other and, further, a plane parallel plate is inserted in the rear part of the lens system.

Hereby
  $r$: Radius of curvature of each lens
  $d$: Thickness or air gap of each lens along the axis
  $n$: Refractive index of each lens for g-line (436mm).
  $v$: Abbe's number of each lens.

EXAMPLE 1)

Total system $f = 1.0000$
Image forming magnification power $\beta = -0.5$
Effective F number 2.5
Position of exit pupil: Infinite

| | | | | |
|---|---|---|---|---|
| I | $r_1 = 1.74295$ | $d_1 = 0.02285$ | $n_1 = 1.69996$ | $v_1 = 32.1$ |
| | $r_2 = 0.69275$ | $d_2 = 0.03044$ | | |
| | $r_3 = 0.73221$ | $d_3 = 0.06862$ | $n_2 = 1.71230$ | $v_2 = 55.7$ |
| | $r_4 = -1.35740$ | $d_4 = 0.09250$ | | |
| II | $r_5 = 0.58494$ | $d_5 = 0.05146$ | $n_3 = 1.79197$ | $v_3 = 49.6$ |
| | $r_6 = 2.15743$ | $d_6 = 0.04277$ | | |
| III | $r_7 = 0.31519$ | $d_7 = 0.15994$ | $n_4 = 1.71230$ | $v_4 = 55.7$ |
| | $r_8 = -5.21304$ | $d_8 = 0.02285$ | $n_5 = 1.69990$ | $v_5 = 32.1$ |
| | $r_9 = 0.16758$ | $d_9 = 0.06077$ | | |
| IV | $r_{10} = -0.55220$ | $d_{10} = 0.02285$ | $n_6 = 1.66381$ | $v_6 = 53.0$ |
| | $r_{11} = -9.20991$ | $d_{11} = 0.01715$ | $n_7 = 1.66373$ | $v_7 = 34.6$ |
| | $r_{12} = -1.49737$ | $d_{12} = 0.09097$ | | |
| V | $r_{13} = -0.18544$ | $d_{13} = 0.01715$ | $n_8 = 1.65960$ | $v_8 = 35.4$ |
| | $r_{14} = 1.08027$ | $d_{14} = 0.12286$ | $n_9 = 1.71230$ | $v_9 = 55.7$ |
| | $r_{15} = -0.37043$ | $d_{15} = 0.02537$ | | |
| VI | $r_{16} = -1.27005$ | $d_{16} = 0.04001$ | $n_{10} = 1.79197$ | $v_{10} = 49.6$ |
| | $r_{17} = -0.52634$ | $d_{17} = 0.00163$ | | |
| VII | $r_{18} = 1.80614$ | $d_{18} = 0.04001$ | $n_{11} = 1.79197$ | $v_{11} = 49.6$ |
| | $r_{19} = -1.35342$ | $d_{19} = 0.00163$ | | |
| VIII | $r_{20} = 0.50623$ | $d_{20} = 0.05716$ | $n_{12} = 1.75178$ | $v_{12} = 51.5$ |
| | $r_{21} = -0.86040$ | $d_{21} = 0.02861$ | $n_{13} = 1.66373$ | $v_{13} = 34.6$ |
| | $r_{22} = 1.27945$ | | | |

EXAMPLE (2)

Total system $f = 1.0000$
Image forming magnification power $\beta = -0.5$
Effective F number 2.5
Position of exit pupil: Infinite

| | | | | |
|---|---|---|---|---|
| I | $r_1 = 1.85106$ | $d_1 = 0.02343$ | $n_1 = 1.69996$ | $v_1 = 32.1$ |
| | $r_2 = 0.71455$ | $d_2 = 0.02390$ | | |
| | $r_3 = 0.74882$ | $d_3 = 0.07034$ | $n_2 = 1.71230$ | $v_2 = 55.7$ |
| | $r_4 = -1.39504$ | $d_4 = 0.06112$ | | |
| II | $r_5 = 0.59756$ | $d_5 = 0.05276$ | $n_3 = 1.79197$ | $v_3 = 49.6$ |
| | $r_6 = 2.20980$ | $d_6 = 0.05644$ | | |
| III | $r_7 = 0.32357$ | $d_7 = 0.16143$ | $n_4 = 1.71230$ | $v_4 = 55.7$ |
| | $r_8 = -7.65617$ | $d_8 = 0.02343$ | $n_5 = 1.69996$ | $v_5 = 32.1$ |
| | $r_9 = 0.17191$ | $d_9 = 0.06629$ | | |
| IV | $r_{10} = -0.56132$ | $d_{10} = 0.02343$ | $n_6 = 1.66381$ | $v_6 = 53.0$ |
| | $r_{11} = \infty$ | $d_{11} = 0.01759$ | $n_7 = 1.66373$ | $v_7 = 34.6$ |
| | $r_{12} = -1.57597$ | $d_{12} = 0.09188$ | | |
| V | $r_{13} = -0.19048$ | $d_{13} = 0.01759$ | $n_8 = 1.65960$ | $v_8 = 35.4$ |
| | $r_{14} = 1.10063$ | $d_{14} = 0.12955$ | $n_9 = 1.71230$ | $v_9 = 55.7$ |
| | $r_{15} = -0.37917$ | $d_{15} = 0.02228$ | | |
| VI | $r_{16} = -1.31312$ | $d_{16} = 0.04101$ | $n_{10} = 1.79197$ | $v_{10} = 49.6$ |
| | $r_{17} = -0.53983$ | $d_{17} = 0.00167$ | | |
| VII | $r_{18} = 1.84153$ | $d_{18} = 0.04101$ | $n_{11} = 1.79197$ | $v_{11} = 49.6$ |
| | $r_{19} = -1.39729$ | $d_{19} = 0.00167$ | | |
| VIII | $r_{20} = 0.52060$ | $d_{20} = 0.05860$ | $n_{12} = 1.75178$ | $v_{12} = 51.5$ |
| | $r_{21} = -0.87295$ | $d_{21} = 0.02933$ | $n_{13} = 1.66373$ | $v_{13} = 34.6$ |
| | $r_{22} = 1.29013$ | $d_{22} = 0.22260$ | | |
| IX | $r_{23} = \infty$ | $d_{23} = 0.02782$ | $n_{14} = 1.52621$ | $v_{14} = 64.1$ |
| | $r_{24} = \infty$ | | | |

EXAMPLE (3)

Total system $f = 1.0000$
Image forming magnification power $\beta = -0.5$
Effective F number 2.5
Position of exit pupil: Infinite

| | | | | |
|---|---|---|---|---|
| I | $r_1 = 6.12944$ | $d_1 = 0.02690$ | $n_1 = 1.66373$ | $v_1 = 34.6$ |
| | $r_2 = 0.93700$ | $d_2 = 0.08070$ | $n_2 = 1.75178$ | $v_2 = 51.5$ |
| | $r_3 = -1.37881$ | $d_3 = 0.03346$ | | |
| II | $r_4 = 0.60640$ | $d_4 = 0.06052$ | $n_3 = 1.79197$ | $v_3 = 49.6$ |
| | $r_5 = 3.31783$ | $d_5 = 0.00336$ | | |
| III | $r_6 = 0.37212$ | $d_6 = 0.17648$ | $n_4 = 1.56851$ | $v_4 = 58.7$ |
| | $r_7 = 57.42595$ | $d_7 = 0.02690$ | $n_5 = 1.65960$ | $v_5 = 35.4$ |
| | $r_8 = 0.21608$ | $d_8 = 0.09048$ | | |
| IV | $r_9 = -0.69138$ | $d_9 = 0.02690$ | $n_6 = 1.66381$ | $v_6 = 53.0$ |
| | $r_{10} = -0.36217$ | $d_{10} = 0.02017$ | $n_7 = 1.66373$ | $v_7 = 34.6$ |
| | $r_{11} = 11.42834$ | $d_{11} = 0.10964$ | | |
| V | $r_{12} = -0.22247$ | $d_{12} = 0.02017$ | $n_8 = 1.65960$ | $v_8 = 35.4$ |
| | $r_{13} = 9.34619$ | $d_{13} = 0.14375$ | $n_9 = 1.52621$ | $v_9 = 64.1$ |
| | $r_{14} = -0.39976$ | $d_{14} = 0.00336$ | | |
| VI | $r_{15} = -1.35888$ | $d_{15} = 0.04707$ | $n_{10} = 1.79197$ | $v_{10} = 49.6$ |
| | $r_{16} = -0.50141$ | $d_{16} = 0.00336$ | | |
| VII | $r_{17} = 2.35151$ | $d_{17} = 0.04707$ | $n_{11} = 1.79197$ | $v_{11} = 49.6$ |
| | $r_{18} = -1.56122$ | $d_{18} = 0.00336$ | | |

—Continued

| | | | | |
|---|---|---|---|---|
| VIII | $r_{19} = 0.60105$ | $d_{19} = 0.06725$ | $n_{12} = 1.75178$ | $v_{12} = 51.5$ |
| | $r_{20} = -1.14309$ | $d_{20} = 0.03362$ | $n_{13} = 1.66373$ | $v_{13} = 34.6$ |
| | $r_{21} = 1.51427$ | $d_{21} = 0.26900$ | | |
| IX | $r_{22} = \infty$ | $d_{22} = 0.03362$ | $n_{14} = 1.52621$ | $v_{14} = 64.1$ |
| | $r_{23} = \infty$ | | | |

What is claimed is:

1. A non-symmetric telecentric lens system consisting of eight lens groups, said eight lens groups being in order from the object side first, second, third, fourth, fifth, sixth seventh and eighth groups, said first lens group comprising a negative meniscus lens having a convex surface facing the object side, said first lens group performing as a positive lens as a whole, said second lens group comprising a positive meniscus lens having a convex surface facing the object side, said third lens group comprising a convex lens and a concave lens cemented together, said lens having the surface closest to the object side being convex and performing as a negative meniscus as a whole, said fourth lens group comprising a lens including a concave surface closest to the object side and performing as a negative lens as a whole, said fifth lens group comprising a convex lens and a and a concave lens cemented together, a surface of the convex lens facing the object side, said fifth lens group performing as a negative meniscus lens, said sixth lens group comprising a positive meniscus lens having a concave surface facing the object side, said seventh lens group comprising a lens having convex surfaces and said eighth group comprising a positive meniscus lens composed of a concave lens and a convex lens cemented together, said eighth group having a convex surface nearest the object.

2. A lens system according to claim 1 in which the first lens group consists of a negative meniscus lens and a lens with opposite convex surfaces.

3. A lens system according to claim 2 in which the negative meniscus lens and the lens with opposite convex surfaces are cemented to each other.

4. A lens system according to claim 1 in which the third lens group comprises a convex lens and a concave lens respectively arranged from the object side.

5. A lens system according to claim 1 in which the fourth lens group is composed of a concave lens having two concave surfaces with a concave surface closest to the object side, and the concave surface farthest from the object and a convex lens being cemented together.

6. A lens system according to claim 1 in which the fifth lens comprises a concave lens and a convex lens arranged respectively from the object side.

7. A lens system according to claim 1 in which the eight lens group comprises a lens having opposite convex surfaces and a lens having opposite concave surfaces, said convex lens being closer to the object side.

* * * * *